US009409810B2

(12) United States Patent
Lehmann et al.

(10) Patent No.: US 9,409,810 B2
(45) Date of Patent: Aug. 9, 2016

(54) METHOD FOR PRODUCING SYNTHETIC QUARTZ GLASS GRANULES

(71) Applicant: Heraeus Quarzglas GmbH & Co KG

(72) Inventors: Walter Lehmann, Leipzig (DE);
Thomas Kayser, Leipzig (DE)

(73) Assignee: Heraeus Quarzglas GmbH & Co. KG,
Hanau (DE)

( * ) Notice: Subject to any disclaimer, the term of this patent is extended or adjusted under 35 U.S.C. 154(b) by 0 days.

(21) Appl. No.: 14/390,991

(22) PCT Filed: Mar. 20, 2013

(86) PCT No.: PCT/EP2013/055772
§ 371 (c)(1),
(2) Date: Oct. 6, 2014

(87) PCT Pub. No.: WO2013/149831
PCT Pub. Date: Oct. 10, 2013

(65) Prior Publication Data
US 2015/0059407 A1 Mar. 5, 2015

(30) Foreign Application Priority Data

Apr. 5, 2012 (DE) .......................... 10 2012 006 914

(51) Int. Cl.
*C03B 20/00* (2006.01)
*C03B 19/09* (2006.01)
(Continued)

(52) U.S. Cl.
CPC ............... *C03B 20/00* (2013.01); *C03B 19/095* (2013.01); *C03B 19/1005* (2013.01);
(Continued)

(58) Field of Classification Search
CPC .... C03B 20/00; C03B 19/095; C03B 19/107; C03B 19/1095; C03B 19/1005; C03B 2201/02; C03B 2201/03
See application file for complete search history.

(56) References Cited

U.S. PATENT DOCUMENTS 2,242,443 A * 5/1941 Stanko ................... C04B 33/32
425/DIG. 101
3,775,077 A 11/1973 Nicastro, Jr. et al.
(Continued)

FOREIGN PATENT DOCUMENTS

DE 102004038602 B3 12/2005
DE 102005045051 A1 3/2007
(Continued)

OTHER PUBLICATIONS

Machine translation of DE 10 2004 038 602, Werdecker et al., Process for making quartz glass for use in the manufacture of lamps and semiconductors involves melting glass by electrically heating in a vacuum, the glass containing a specified concentration of temperature-stable hydroxyl groups, Dec. 29, 2005.*
(Continued)

*Primary Examiner* — Queenie Dehghan
(74) *Attorney, Agent, or Firm* — Tiajoloff & Kelly LLP

(57) ABSTRACT

The production of quartz glass granules comprises the granulation of pyrogenically produced silicic acid and the formation of a $SiO_2$ granulate (9), the drying and cleaning of the $SiO_2$ granulate (9) by heating in an atmosphere containing halogen, and the vitrification of the $SiO_2$ granulate (9) under a treatment gas which contains at least 30% by volume of helium and/or hydrogen. This process is time-consuming and expensive. In order to provide a method which, starting from a porous $SiO_2$ granulate (9), allows the cost-effective production of dense, synthetic quartz glass granules suitable for melting bubble-free components of quartz glass, the invention proposes that the cleaning and vitrification of the $SiO_2$ granulate (9) and a post-treatment of the vitrified quartz glass granules are carried out in each case in a rotary tube (6) of a rotary kiln (1), said rotary tube rotating about a central axis (7), wherein the rotary tube (6) comprises an inner wall made of a ceramic material during vitrification, and wherein the vitrified quartz glass granules are subjected to a post-treatment during a treatment period of at least 10 minutes in an atmosphere which contains less than 20% of helium or hydrogen at a treatment temperature of 300° C. or more.

24 Claims, 1 Drawing Sheet

(51) Int. Cl.
*C03B 19/10* (2006.01)
*C03C 23/00* (2006.01)

(52) U.S. Cl.
CPC .......... *C03B 19/107* (2013.01); *C03B 19/1095* (2013.01); *C03C 23/0075* (2013.01); *C03B 2201/02* (2013.01); *C03B 2201/03* (2013.01)

(56) References Cited

U.S. PATENT DOCUMENTS

| | | | |
|---|---|---|---|
| 4,032,315 A | | 6/1977 | van der Steen |
| 4,255,332 A | | 3/1981 | Davies |
| 4,878,947 A | * | 11/1989 | Helferich ................ C04B 35/19 106/602 |
| 5,637,284 A | * | 6/1997 | Sato ........................ C03C 1/022 106/482 |
| 6,360,563 B1 | | 3/2002 | Gerhardt et al. |
| 6,380,517 B2 | * | 4/2002 | Morgan ..................... F27B 7/06 219/388 |
| 2003/0041623 A1 | | 3/2003 | Werdecker et al. |
| 2003/0226376 A1 | | 12/2003 | Winnen et al. |
| 2008/0268201 A1 | * | 10/2008 | Fiacco ..................... C03B 19/12 428/131 |
| 2013/0219963 A1 | * | 8/2013 | Lehmann ............ C03B 19/1005 65/17.4 |

FOREIGN PATENT DOCUMENTS

| | | |
|---|---|---|
| DE | 102010021693 A1 | 1/2011 |
| EP | 1076043 A2 | 2/2001 |
| EP | 1088789 A2 | 4/2004 |
| JP | 10287416 A | 10/1998 |
| WO | 88/03914 A1 | 6/1988 |
| WO | 0146077 A1 | 6/2001 |

OTHER PUBLICATIONS

Machine translation of DE 10 2005 045 051, Ludwig et al., Indirectly heated rotary kiln suitable for high temperatures comprises multiple barrels within a common furnace, Mar. 22, 2007.*
Espacenet English language abstract of JP H10287416 A, published Oct. 27, 1998.
Espacenet English language abstract of EP 1076043 A2, published Feb. 14, 2001.
Espacenet English language abstract of DE 102004038602 B3, published Dec. 29, 2005.
Espacenet English language abstract of DE 102005045051 A1, published Mar. 22, 2007.

* cited by examiner

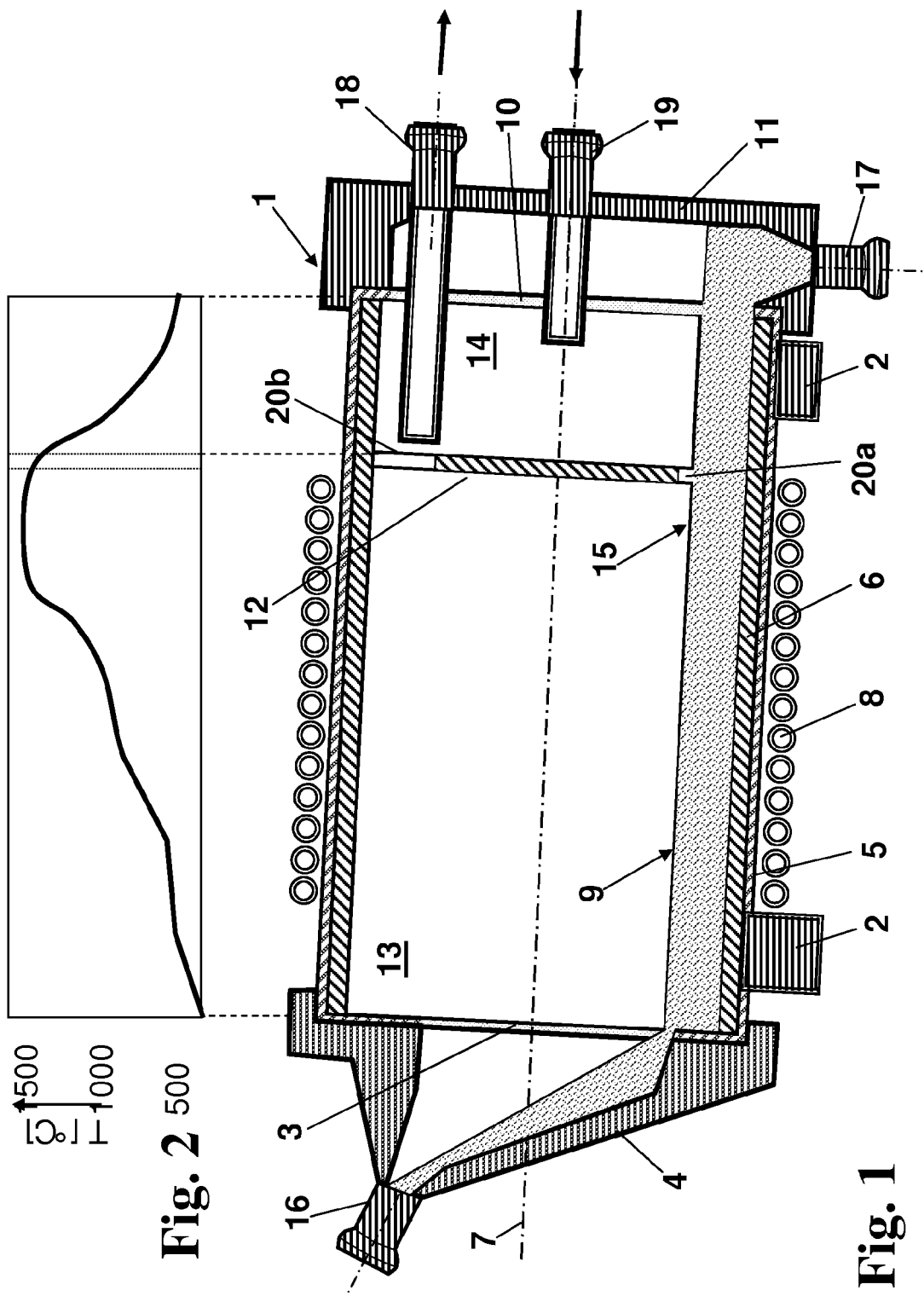

METHOD FOR PRODUCING SYNTHETIC QUARTZ GLASS GRANULES

The present invention relates to a method for producing synthetic quartz glass granules by vitrifying a free-flowing $SiO_2$ granulate, the method comprising the steps of:
(a) granulating pyrogenically produced silicic acid and forming the $SiO_2$ granulate of porous granulate particles,
(b) drying the $SiO_2$ granulate,
(c) cleaning the $SiO_2$ granulate by heating in a halogen-containing atmosphere,
(d) vitrifying the purified $SiO_2$ granulate in a treatment gas which contains at least 30% by vol. of helium and/or hydrogen so as to form vitrified quartz glass granules.

The dense quartz glass granules can be used for producing quartz glass components, such as crucibles, tubes, holders, bells, reactors for semiconductor or lamp manufacture and for chemical process engineering. Apart from purity and chemical resistance, high temperature stability often plays a decisive role in such manufacturing processes. Temperature values around 1150° C. are indicated in the literature as the lower softening point for pure quartz glass. The necessary process temperatures are however often higher, resulting in plastic deformations of the quartz-glass components.

PRIOR ART

The basic problem consists in densifying the porous $SiO_2$ granulate without any bubbles, if possible. The porous granulate particles are agglomerates of $SiO_2$ particles, as are e.g. obtained in the manufacture of synthetic quartz glass by polymerization, polycondensation, precipitation or CVD methods. On account of their low bulk density, the direct fusion of such $SiO_2$ particles poses problems, so that they are normally pre-densified first of all by granulation. Roll granulation, spray granulation, centrifugal atomization, fluidized bed granulation, granulating methods using a granulating mill, compaction, roller presses, briquetting, flake production or extrusion should be mentioned as examples.

The discrete, mechanically and possibly also thermally pre-densified particles obtained thereby are thus composed of a multitude of primary particles and are here called "$SiO_2$ granulate particles". In their entirety they form the porous "$SiO_2$ granulate".

During fusion of the "$SiO_2$ granulate" into quartz glass there is the risk that closed, gas-filled cavities are formed which cannot be removed or can be removed only at a very slow pace from the highly viscous quartz glass mass and which thereby lead to bubbles in the quartz glass. Therefore, it is normally necessary for sophisticated applications that dense vitrified quartz-glass particles should be produced from the porous granulate particles. The prior art knows about a multitude of different techniques for achieving these goals.

EP 1 076 043, for instance, suggests that porous $SiO_2$ granulate should be poured into a burner flame to finely disperse the same therein and to vitrify it at temperatures of 2000-2500° C. The granulate is preferably obtained by spray or wet granulation of filter dust and has grain sizes in the range of 5 μm to 300 μm. Prior to vitrification it can be heated by treatment with microwave radiation and can be pre-densified.

The degree of sintering of a given granulate particle depends on its particle size and on the heat input which, in turn, is determined by the residence time in the burner flame and the flame temperature. As a rule, however, the granulate shows a certain particle size distribution, and the combustion gas flame has regions of different flow velocities and flame temperatures. This leads to irregular and hardly reproducible sintering degrees. Moreover, there is the risk that the quartz glass particles are contaminated by the combustion gases. Loading with hydroxyl groups upon use of hydrogen-containing combustion gases should here particularly be mentioned, which is accompanied by a comparatively low viscosity of the quartz glass.

EP 1 088 789 A2 suggests for the vitrification of porous $SiO_2$ granulate that synthetically produced granulate should first be cleaned by heating in HCl-containing atmosphere in a rotary kiln, that it should subsequently be calcined in a fluidized bed and then vitrified in a vertical fluidized-bed apparatus or in a crucible under vacuum or helium or hydrogen to obtain synthetic quartz-glass granules.

This represents a discontinuous vitrification process accompanied by great thermal inertia of the furnace and thus long process periods with correspondingly great efforts in terms of time and costs and with a low throughput and with a granulate that is relatively expensive on the whole.

In a similar method according to JP 10287416A, particulate $SiO_2$ gel with diameters in the range between 10 μm and 1,000 μm is continuously densified in a rotary kiln. This kiln comprises a rotary tube of quartz glass having a length of 2 m and an inner diameter of 200 mm. The rotary tube is heated by means of heaters from the outside and is divided into plural temperature zones that cover the temperature range of 50° C. to 1,100° C. The particulate $SiO_2$ gel with particles sizes between 100 μm and 500 μm is freed of organic constituents in the rotary tube, which is rotating at 8 rpm, by supply of an oxygen-containing gas and is sintered to form $SiO_2$ powder. The kiln atmosphere during sintering contains oxygen and, optionally, argon, nitrogen or helium.

The $SiO_2$ powder obtained thereafter contains, however, also silanol groups in a high concentration of not less than 1,000 wt. ppm. For the elimination thereof the $SiO_2$ powder is subsequently calcined and dense-sintered at an elevated temperature of 1,300° C. in a quartz glass crucible with an inner diameter of 550 mm in batches of 130 kg.

The thermal stability of a rotary tube of quartz glass limits the use thereof at a high temperature for the vitrification of the granulate particles. During vitrification in the quartz glass crucible, however, there may occur a caking of the sintering granulate particles, resulting in an undefined pore-containing quartz glass mass.

WO 88/03914 A1 also teaches the reduction of the BET surface area of an amorphous porous $SiO_2$ powder using a rotary kiln in a helium- and/or hydrogen-containing atmosphere. In a first procedure fine $SiO_2$ soot dust is put into a rotary kiln, heated in air to 1200° C. and kept at this temperature for 1 h. The result of this process should be a free-flowing, spherical granulate with grain sizes of 0.1 mm to 5 mm, and a BET surface area of <1 $m^2/g$ is mentioned. Soot dust is however not free-flowing, it is extremely sinter-active, and it can be easily blown away. The processing of soot dust in a rotary kiln is therefore extremely difficult. In a modification of this procedure, it is suggested that $SiO_2$ soot dust should be mixed with water, resulting in a moist crumb-like mass. This mass is put into a rotary kiln and densified at a temperature of 600° C. into a powder having grain sizes of 0.1 mm to 3 mm. The $SiO_2$ powder that has been pre-densified in this way is subsequently vitrified in a separate kiln.

DE 10 2004 038 602 B3 discloses a method for producing electrically melted synthetic quartz glass for use in the manufacture of lamps and semiconductors. Thermally densified $SiO_2$ granulate is used as the starting material for the electrically melted quartz glass. The granulate is formed by granulating an aqueous suspension consisting of amorphous, nanoscale and pyrogenic $SiO_2$ particles produced by flame hydrolysis of $SiCl_4$.

For increasing the viscosity the $SiO_2$ granulate is doped with $Al_2O_3$ by adding nanoparticles of pyrogenically produced $Al_2O_3$ or a soluble aluminum salt to the suspension.

This yields round granulate grains having outer diameters in the range between 160 μm and 1000 μm. The granulate is dried at about 400° C. in the rotary kiln and densified at a temperature of about 1420° C. up to a BET surface area of about 3 $m^2/g$.

For complete vitrification the individual grains of the granulate are then completely vitrified in different atmospheres, such as helium, hydrogen or vacuum. The heating profile during vitrification of the granulates comprises heating to 1400° C. at a heating rate of 5° C./min and a holding time of 120 min After this treatment the individual granulate grains are vitrified in themselves. The grains are present in individual form without being melted into a mass.

The granulate is further processed in an electric melting process to obtain quartz glass; it is e.g. melted in a crucible to obtain a molding, or it is continuously drawn into a strand in a crucible type drawing method.

Vitrification is here also carried out in a separate kiln, so that this is also a discontinuous method with a plurality of cost-intensive heating processes.

U.S. Pat. No. 4,255,332 A describes the use of a rotary kiln for producing glass particles for filtering purposes. Finely ground glass powder with particle sizes of around 100 μm is mixed with water and binder and processed into granulate particles with particle sizes of about 300 μm to 4.5 μm. These particles are sintered in a rotary kiln having a rotary tube of mullite into substantially spherical pellets with sizes of around 500-4000 μm.

TECHNICAL OBJECTIVE

It is the object of the present invention to indicate a method which, starting from a porous $SiO_2$ granulate, allows a cost-effective production of dense, synthetic quartz glass granules suitable for melting bubble-free components of quartz glass.

GENERAL DESCRIPTION OF THE INVENTION

This object, starting from a method of the aforementioned type, is achieved according to the invention by a method in which cleaning and vitrification of the $SiO_2$ granulate are respectively carried out in a rotary tube of a rotary kiln, said rotary tube rotating about a central axis, wherein vitrification according to method step (d), which is carried out in a rotary tube with an inner wall consisting of a ceramic material, is followed by a post-treatment of the vitrified quartz glass granules, in which the vitrified quartz glass granules are annealed in an atmosphere containing less than 20% helium or hydrogen at a treatment temperature of 300° C. or more for a treatment period of at least 10 minutes.

The $SiO_2$ granulate is obtained in that pyrogenically produced silicic acid—hereinafter also called "$SiO_2$ soot dust"—is pre-densified with the help of standard granulation methods.

The granulating process can be performed by using a rotary tube, as is known from the prior art. It is however essential that at least the thermal treatment steps subsequent to the granulate manufacturing process at a high temperature, namely cleaning and vitrifying, are each carried out in a rotary kiln. This achieves a substantially continuous production process, and a change of the kiln system is avoided. This facilitates timing as well as spatial adaptation in successive treatment steps and helps to shorten the cycle time of the granulate.

The rotary kilns are tailored to the specific requirements of the respective treatment step. A rotary kiln may here be subdivided into a plurality of treatment chambers kept separate from one another. To be more specific, in the case of a granulate that is already substantially dry, finish drying as well as cleaning can be carried out in a method step in a cleaning furnace. Ideally, however, a separate rotary kiln is provided for each of the treatment steps drying, cleaning and vitrifying. Treatment duration, temperature and atmosphere can thereby be optimally adapted to the respective process independently of each other, which results in a qualitatively better end product. As a result, e.g. during the transitions from drying to cleaning and from cleaning to vitrifying it is e.g. possible to utilize the residual heat of the preceding process.

The treatments are each carried out in rotary kilns with a heated rotary tube rotating about a central axis. This tube is slightly inclined in the longitudinal direction of the furnace to induce a transportation of the granulate from its inlet side to the outlet side.

On account of the high temperature and the material load entailed thereby, this leads to special requirements during vitrification in the rotary kiln; these shall be explained in more detail hereinafter.

Viewed over the length of the rotary tube a temperature profile is produced during vitrification with a temperature maximum that is higher than the softening temperature of quartz glass, i.e. above 1150° C. To allow this without deformation of the rotary tube, the inner wall of the rotary tube or at least the highly loaded part thereof consists of a temperature-resistant ceramic material having a higher softening temperature than undoped quartz glass.

The rotary tube consists of one part or of a plurality of parts, the inner wall of the rotary tube consisting of the temperature-resistant ceramic material at least over the sub-length that is exposed to the maximum temperature load. The inner wall is an integral part of the rotary tube or it is e.g. configured as an inner lining of the rotary tube.

The granulate particles are heated in the rotary tube to a temperature that is sufficient for vitrification. The quartz glass particles obtained therefrom after vitrification have a specific surface area of less than 1 $cm^2/g$ (determined according to DIN ISO 9277-May 2003. "Bestimmung der spezifischen Oberflache von Feststoffen durch Gasadsorption nach dem BET-Verfahren"). The surface is dense; the particles may here be transparent or partly opaque.

To enable the vitrification of the bulk material consisting of porous $SiO_2$ granulate in the rotary tube, another precondition is an atmosphere containing helium and/or hydrogen. Only an atmosphere containing enough helium and/or hydrogen permits a bubble-free or specifically low-bubble fusion of the porous granulate particles at a low temperature and/or with short vitrification durations, as are possible under the conditions of rotary kiln vitrification. Possibly entrapped gases consist mainly (e.g. at least 90 vol. %) of helium. Amounts of hydrogen which can also easily diffuse out during further processing of the vitrified quartz glass granules and also small amounts of other gases are harmless for many applications.

It is therefore intended according to the invention that during vitrification the rotary tube is either flooded with a treatment gas or that it is flushed with this treatment gas continuously or from time to time, wherein the treatment gas consists of at least 30 vol. % of helium and/or hydrogen and at the same time contains hardly any, or ideally no, nitrogen, for it has been found that granulate particles vitrified in the presence of nitrogen tend to have a higher bubble content.

When traveling through the rotary tube, the granulate particles are exposed to mechanical forces which are produced by the weight and the circulation of the bulk material. Possible agglomerates of the vitrified granules are here dissolved again.

Vitrification in the rotary furnace comprises one pass or plural passes. In the case of plural passes the temperature can be raised from pass to pass. It has been found that in the case of plural passes a lower bubble content is achieved in the quartz glass granules.

The vitrified quartz glass granules can be fused directly for producing quartz glass components. It has however been found that depending on the fusion technique and in the case of very high demands made on the absence of bubbles in the quartz glass components, the above-explained vitrification measures in the rotary furnace are not sufficient, although the resulting granules evidently seem to be completely transparent.

However, if the vitrification process is followed by a thermal post-treatment of the vitrified quartz glass granules in a helium- or hydrogen-low atmosphere, the amount of bubbles in the quartz glass component fused therefrom can be reduced considerably. This post-treatment is the more efficient, the lower the concentration of helium and hydrogen in the atmosphere and the higher the product of treatment temperature and duration is. A bubble-reducing effect of the post-treated granules is observed in treatment atmospheres which contain less than 20% helium or hydrogen and at treatment temperatures above 300° C., preferably above 800° C. and at treatment durations of at least 10 minutes, preferably at least 15 minutes.

During post-treatment of the vitrified quartz glass granules the atmosphere is ideally free of helium and hydrogen; small amounts of said gases of less than 20 vol. % are harmless. In the simplest case it consists essentially of nitrogen or argon, but it may also contain oxygen.

With the use of helium and/or hydrogen during vitrification a complete vitrification of the porous granulate particles is possible at a comparatively low temperature and within a short period of time. However, due to the manufacturing process, the quartz glass granules vitrified in this manner contain helium and hydrogen, respectively. The bubble-reducing effect of the post-treatment is due to the fact that despite the high diffusion speeds of said gases the vitrification conditions given by the rotary kiln method, are not adequate especially due to the short duration and low temperature to also allow a sufficient out-diffusion of said gases out of the highly loaded granules during cooling. This is particularly applicable to the comparatively large quartz glass particles. Of decisive importance to the success of the post-treatment are those parameters that facilitate an out-diffusion of helium and hydrogen from the vitrified granules, i.e. particularly temperature, duration and partial pressure of said gases into the atmosphere surrounding the quartz glass granules.

As for the temperature, the core temperature of the granules is per se decisive because an out-diffusion of the said gases from the particle volume is of major importance. The surface temperature of the quartz glass granules, however, can be checked more easily and is therefore adjustable in a reproducible manner.

In principle, the core temperature is decreasing to a lesser degree the lower the temperature drop of the surface temperature is during transition in the hot treatment steps.

In a preferred procedure, it is therefore provided that the surface temperature of the vitrified quartz glass granules between the method steps of vitrification and post-treatment does in each case not fall below 200° C., preferably not below 800° C.

Moreover, this leads to a better utilization of the remaining heat from one method step to the next one. This demand on a temperature drop which is as low as possible between successive method steps advantageously also regards the surface temperature of the $SiO_2$ granulate between the method steps of cleaning and vitrification.

A complete elimination of the helium and hydrogen loading of the quartz glass granules vitrified in the rotary kiln is not required. It has turned out to be sufficient for a bubble-free fusion of the quartz glass granules also under difficult melting conditions, i.e. in the case of short fusion periods and large melting masses, when the content of hydrogen and helium per 1 $cm^3$ quartz glass granules is such that it occupies a gas volume of less than 2 $cm^3$ under normal conditions.

The vitrification process under helium and/or hydrogen leads to a high loading of the quartz glass granules with said gases. During outgassing one achieves a gas volume of helium and hydrogen up to three times the gas volume under normal conditions (at room temperature (25° C.) and atmospheric pressure). The post-treatment leads to a reduction of this gas loading by at least one third, so that the outgassing of the post-treated quartz glass granules yields a gas volume of helium and hydrogen of all in all less than two times the gas volume.

The post-treatment of the quartz glass granules can be carried out in a separate furnace, e.g. a separate rotary kiln. However, with respect to a procedure that is as productive as possible and substantially continuous, one and the same rotary kiln is used for the vitrification of the $SiO_2$ granulate and for the post-treatment of the quartz glass granules, which rotary kiln, viewed in the direction of the central axis, is subdivided into zones, comprising a vitrification zone and a post-treatment zone.

The individual zones of the rotary kiln differ in their temperature, the atmosphere and the length, which substantially defines the treatment duration of the granulate and of the vitrified granules.

The zones may also differ in the chemical composition of the rotary kiln. For instance, preferably a rotary tube of quartz glass is provided in the post-treatment zone. In the case of rotary tubes of different materials, these may be butt-joined, but are preferably inserted into one another with a certain play to mitigate problems caused by different thermal expansion coefficients of the respective materials.

To be able to adjust the atmospheres in the different zones of the rotary kiln substantially independently of one another, neighboring zones of the rotary kiln are fluidically separated from one another to a certain degree and for this purpose they are preferably subdivided by separating screens provided with openings or by labyrinth traps.

In the sense of a substantially continuous procedure only one rotary kiln is used also for drying and cleaning the $SiO_2$ granulate, said kiln, viewed in the direction of the central axis, being subdivided into zones, comprising a drying zone and a cleaning zone.

The subdivision into zones is preferably carried out again by separating screens provided with openings or by labyrinth traps. In the area of the drying and cleaning zone, the inner wall of the rotary tube consists preferably of quartz glass so as to avoid contamination of the granulate.

If several process steps take place in a joint rotary kiln, such as drying/cleaning or vitrification/post-treatment, each of the zones may be provided with its own heater. For good energy exploitation the rotary tubes for cleaning and vitrification are each heated by means of a resistance heater surrounding the rotary tube, and the rotary tube used for post-treatment or a portion of the rotary tube used for post-treatment is not directly heated.

The method according to the invention yields particularly good results in cases where the granulate particles have a mean grain size between 100 μm and 200 μm, preferably between 200 μm and 400 μm.

Granulate particles with a mean grain size of more than 1000 μm can be vitrified only at a slow pace. Particularly fine-grained quartz glass granules tend to caking with the rotary tube wall.

To minimize said effect, it has turned out be useful to set a fines content of the $SiO_2$ granulate with particles sizes of less than 100 μm in advance in such a manner that it accounts for less than 10% by wt. of the total weight of the granulate.

Drying of the granulate according to method step (b) is carried out preferably by heating in air at a temperature in the range between 200° C. and 600° C.

In this procedure a separate drying furnace which is preferably designed as a rotary kiln is provided for drying the granulate. The temperature is constant or is increased as the drying process is progressing. At temperatures below 200° C. one obtains long drying durations. Above 600° C. entrapped gases may exit rapidly; this may lead to the destruction of the granulates.

Cleaning in the rotary tube according to method step (c) is carried out in a chlorine-containing atmosphere at a temperature ranging between 900° C. and 1250° C.

The chlorine-containing atmosphere especially effects a reduction of alkali and iron impurities from the $SiO_2$ granulate. Temperatures below 900° C. lead to long treatment durations and temperatures above 1250° C. pose the risk of a dense-sintering of the porous granulate with inclusion of chlorine or gaseous chlorine compounds.

Unless otherwise indicated, the following explanations refer to advantageous configurations during vitrification of the granulate in the rotary kiln.

With respect to a particularly high density and a low bubble content, a treatment gas has turned out to be useful during vitrification that contains at least 50 vol. % helium and/or hydrogen, preferably at least 95 vol. %. The residual amount may be formed by inert gases, such as argon or by nitrogen and/or oxygen, the volume fraction of the two last-mentioned gases being preferably less than 30%; hence, the atmosphere is poor in nitrogen and oxygen.

The granulate particles are heated in the rotary tube to a temperature that effects vitrification. A temperature in the range of 1300° C. to 1600° C. has turned out to be useful.

At temperatures of less than 1300° C. a long treatment period is required for complete vitrification. Preferably, the temperature is at least 1450° C. At temperatures above 1600° C. rotary tube and kiln are thermally excessively loaded.

The mechanical load on the granulates due to rotation of the rotary tube reduces the risk of agglomerate formations. At high temperatures above about 1400° C. the quartz glass is however partly softened, so that adhesions to the rotary tube wall may be observed in the areas showing hardly any movement.

To avoid such a situation, it is intended in a preferred procedure that the granulate particles are subjected to vibration.

Vibration can be produced by shaking or striking or by ultrasound. It is carried out regularly or in pulsed fashion from time to time.

The high vitrification temperature can be produced by burners acting on the granulate particles. Preferred is however a procedure in which heating is carried out by means of a resistance heater surrounding the rotary tube.

The heat input from the outside via the rotary tube requires a configuration consisting of a temperature-resistant ceramic material, as has been explained above. This type of heating prevents a situation where the granulate particles are influenced by a combustion gas mechanically (by blowing away) or chemically (by impurities).

A substance that simultaneously increases the viscosity of quartz glass, preferably $Al_2O_3$, $ZrO_2$ or $Si_3N_4$, is advantageously suited as a material for the inner wall of the rotary tube.

In this case the material of the inner wall of the rotary tube exhibits the additional characteristic that it contains a dopant that contributes to an increase in the viscosity of quartz glass and thus to an improvement of the thermal stability of quartz glass components. The porous granulate particles that do not contain the dopant or contain it in an inadequate concentration are continuously heated in the rotary tube and thereby circulated. Contact with the dopant-containing inner wall yields a finely divided abrasion which leads to a desired doping of the granulate particles or contributes thereto. As a rule, the dopant is present in the quartz glass as an oxide. Hence, a central idea of this embodiment of the method according to the invention consists in carrying out the complete vitrification of the porous $SiO_2$ granulate particles in a rotary kiln at a high temperature, which is made possible by way of a suitable atmosphere during vitrification and by a temperature-resistant material for the rotary tube, which simultaneously serves—due to abrasion—as a dopant source for the quartz glass granules. This method permits a continuous vitrification of the $SiO_2$ granulate particles and thus homogeneous loading with the viscosity-enhancing dopant at the same time.

Especially $Al_2O_3$ and nitrogen (in the form of $Si_3N_4$) are suited as suitable dopants in this sense. For an adequate input of said dopants it is advantageous when the inner wall of the rotary tube consists at least in the highly loaded area of the substance in question of at least 90% by wt., preferably at least 99% by wt.

$Al_2O_3$, in particular, is distinguished by a high temperature resistance, a high thermal shock resistance and corrosion resistance. In the simplest case the whole inner wall of the rotary tube consists of $Al_2O_3$. Otherwise, the part of the rotary tube that is exposed to the highest temperature load consists of $Al_2O_3$.

At high temperatures the granulate particles and the vitrified quartz-glass particles may be contaminated by abrasion of the material of the inner wall of the rotary tube. Already minor alkali contents enhance the tendency of quartz glass to devitrification to a considerable extent. Therefore, the substance of the inner wall of the rotary tube preferably comprises an alkali content of less than 0.5%.

For doping the quartz glass particles with $Al_2O_3$ this contamination is counteracted by way of impurities if the inner wall of the rotary tube consists of synthetically produced $Al_2O_3$. Synthetically produced $Al_2O_3$ with a purity of more than 99% by wt. is known under the trade name "Alsint". To minimize the costs of the material, the synthetic material can be limited to the area of a thin inner lining of the rotary tube.

When an $Al_2O_3$-containing rotary tube is used, the quartz glass granules can thereby be $Al_2O_3$-doped in the range of from 1 to 20 wt. ppm in a simple manner.

As an alternative, the inner wall of the rotary tube consists of $ZrO_2$ or $TiO_2$.

These materials are distinguished by sufficiently high melting temperatures for the vitrification of the $SiO_2$ granulate ($ZrO_2$: about 2700° C.; $TiO_2$: about 1855° C.) and they are harmless as contamination in a small concentration for many applications, e.g. for semiconductor manufacturing.

Apart from a possible metallic surrounding, the rotary tube consists entirely of the ceramic material in the simplest case.

For a vitrification of the granulate particles that is as uniform as possible and for a loading with dopant that is as homogeneous as possible, approximately identical particle sizes are advantageous. In this respect it has turned out to be useful when the granulate particles have a narrow particle size distribution in which the particle diameter assigned to the $D_{90}$ value is at the most twice as large as the particle diameter assigned to the $D_{10}$ value.

A narrow particle size distribution exhibits a comparatively low bulk density, which counteracts agglomeration during vitrification. Moreover, in the case of an ideally monomodal size distribution of the granulate particles, the weight difference between the particles is no longer applied as a parameter for a possible separation in the bulk material, which is conducive to a more uniform vitrification of the bulk material.

The vitrified quartz glass particles can be used for producing components of opaque or transparent quartz glass, as e.g. a tube of opaque quartz glass which is produced in a centrifugal process. They can also be used as a particulate start material for producing a quartz glass cylinder in the so-called Verneuil process.

Preferably, the quartz glass particles are however used for producing a quartz glass crucible, particularly for producing the outer layer of the crucible.

The viscosity-enhancing effect of the dopant of the quartz glass particles helps to prolong the service life of the quartz glass crucible.

EMBODIMENT

The invention shall now be explained in more detail with reference to an embodiment and a drawing. In a schematic illustration, FIG. 1 shows a rotary kiln for carrying out the vitrifying and post-treating step in the method according to the invention, in a side view; and FIG. 2 shows a temperature profile over the length of the rotary kiln.

FIG. 1 shows a rotary kiln 1 which is supported on rollers 2. The rotary kiln 1 substantially comprises a frame 5 of SiC in which a rotary tube 6 of synthetically produced $Al_2O_3$ (trade name Alsint) and with an inner diameter of 150 mm and a length of 1.8 m is fixed. The rotary tube 6 is rotatable about a central axis 7 and heatable by means of a resistance heater 8 provided on the outer jacket.

The rotary kiln 1 is slightly inclined in longitudinal direction 7 relative to the horizontal to induce the transportation of a loose material consisting of porous $SiO_2$ granulate 9 from the inlet side 3 of the rotary kiln 1 to the removal side 10. The open inlet side 3 is closed by means of a rotatorily fixed inlet housing 4. The inlet housing 4 is equipped with an inlet 16 for the supply of porous $SiO_2$ granulate 9 and with a further inlet (not shown) for the supply of helium and other treatment gases.

The open removal side 10 of the rotary tube 6 is closed by means of an also rotatorily fixed removal housing 11. The removal housing 11 is provided with an outlet 17 for the removal of vitrified and post-treated quartz glass granules 15; gas can also flow via said outlet out of the rotary kiln 1. For the suction of helium-rich gas a suction nozzle 18 is provided that is arranged in the upper area of the rotary kiln 1. Furthermore, the removal housing 11 is equipped with a gas inlet nozzle 19 by means of which a helium-free gas, particularly argon, is introduced into the rotary tube 6.

With the help of a separating screen 12 the interior is subdivided into a preheating and vitrification zone 13 and into a post-treatment zone 14. The separating screen 12 is configured such that it is permeable to the loose material of the granulate particles 9 and the vitrified quartz glass granules, respectively, but otherwise substantially separates the gas chambers. For this purpose, it is fixed to the inner wall of the rotary tube 6 and comprises two radially opposite openings 20a, 20b of an identical size on its outer edge. Whenever the one opening 20a passes due to the rotation of the rotary tube 6 into the area of the loose material of the granulate 9 or the quartz glass granules 15, respectively, it lets them pass and it is simultaneously clogged to a substantial degree by the loose material, so that at that place only a small amount of gas can escape out of the vitrification zone 13 into the post-treatment zone 14. At the same time, the opposite opening 20b is in its uppermost position in the rotary kiln 1. The relatively light helium gas preferably exits there and is sucked off by means of the suction nozzle 18 directly positioned there and is simultaneously replaced by argon via the gas inlet 19.

A substantial separation of the gas chambers from preheating/vitrification zone 13 and post-treatment zone 14 is possible in this way. A plurality of subsequently arranged separating screens 12 with openings arranged offset to one another in the manner of a labyrinth can serve an even more efficient separation, or separate rotary kilns are used for the vitrification of the granulate 9 and the post-treatment thereof. In the last-mentioned case the vitrified quartz glass granules which are in a hot state having a temperature of at least 200° C. are transferred directly into the rotary kiln for post-treatment.

The resistance heater 6 does not cover the area of the post-treatment zone 14; apart from the heat input by convection and heat conduction from the neighboring vitrification zone 13, it is unheated.

The method according to the invention shall now be described in more detail with reference to embodiments:

Producing, Drying and Cleaning of $SiO_2$ Granulate

Example A

The granulate was produced by granulating a slurry with 60% by wt. of residual moisture from pyrogenic silicic acid (nanoscale $SiO_2$ powder, $SiO_2$ soot dust) and demineralized water in the intensive mixer. After granulation the residual moisture was <20%. The granulate was sieved to grain sizes of <3 mm.

The residual moisture was lowered to <1% by drying at 400° C. in a rotary furnace (throughput: 20 kg/h) in air. Subsequently, the fines fraction with grain sizes of <100 μm was removed. Sieving to the fraction 150-750 μm is carried out; this means that the fines fraction with grain sizes of <100 μm was removed. The grain size distribution is distinguished by a D10 value of about 200 μm and a D90 value of about 400 μm.

Subsequently, cleaning and further drying in HCl-containing atmosphere was carried out in the rotary kiln at a maximum temperature of 1040° C. (throughput: 10 kg/h). The specific surface area (BET) is here reduced by about 50%.

This yielded a $SiO_2$ granulate of synthetic undoped quartz glass of high purity. It consists essentially of porous spherical particles with a particle size distribution having a D10 value of 200 µm, a D90 value of 400 µm, and a mean particle diameter (D50 value) of 300 µm.

Example B

The granulate was produced by high-speed granulation from pyrogenic silicic acid (nanoscale $SiO_2$ powder, $SiO_2$ dust) and demineralized water in the intensive mixer. For this purpose demineralized water is fed into the intensive mixer and pyrogenic silicic acid is added under mixing until the residual moisture is about 23% by wt. and a granulate is produced. The granulate is sieved to grain sizes of ≤2 mm.

The residual moisture is lowered to <1% by drying at 350° C. in a rotary kiln (throughput 15 kg/h) in air. The fines fraction with grain sizes<100 µm was removed; otherwise, no further sieving operation was carried out.

Subsequently, cleaning and further drying are carried out in HCl-containing atmosphere in the rotary kiln at temperatures of 1050-1150° C. (throughput: 10 kg/h).

The sum of chemical contaminants is reduced during hot chlorination to less than 1/10 of the starting material (i.e., to <10 ppm). The granulate consists essentially of porous spherical particles having a particle size distribution with a D10 value of 300 µm, a D90 value of 450 µm and a mean particle diameter (D50 value) of 350 µm.

Vitrification of the Granulate

The rotary tube 6 which is rotating about its rotation axis 7 at a rotational speed of 8 rpm is continuously fed with undoped porous $SiO_2$ granulate 9 at a feed rate of 15 kg/h.

The rotary tube 6 is inclined in longitudinal direction 7 at the specific angle of repose of the granulate particles 9, so that a uniform thickness of the loose granulate is set over the length thereof. The uniform loose-material thickness facilitates the substantial separation of the interior of the rotary tube into preheating and vitrification zone 13 and into the post-treatment zone 14, respectively. The loose material shown in FIG. 1 in the inlet housing 4 shows a different angle of repose; this only serves simplified schematic illustration.

The zone 13 of the rotary tube 3 is flooded with helium. The loose granulate is continuously circulated and heated in this process by means of the resistance heater 8 within the rotary tube 6 and gradually vitrified into quartz glass particles 15. The maximum temperature shortly before approximately the rear third of the rotary tube 6 is about 1460° C. The rotary tube 6 of $Al_2O_3$ withstands said temperature without difficulty.

The loose material of the vitrified quartz glass particles 15 passes via the openings 20a; 20b of the separating screen 12 gradually into the post-treatment zone 14. Due to the continuous introduction of argon via the gas inlet 19, and as a result of the approximately identical gas loss of helium-rich vitrification atmosphere, on the one hand, by the suction of the helium-rich gas exiting through the openings (20a, 20b) of the separating screen 12 by means of suction nozzle 18 and, on the other hand, due to the gas loss via the removal nozzle 17, an atmosphere consisting of a mixture of helium with a distinct surplus amount of argon is obtained in the post-treatment zone 14; the helium content is less than 20 vol. %. Since the post-treatment zone 14 is not directly heated, the temperature from the separating screen 12 up to the outlet housing 11 is continuously decreasing. The mean surface temperature of the vitrified granules 15 is there slightly more than 500° C. The mean residence time of the vitrified granules 15 in the post-treatment zone 14 is about 40 minutes.

An axial temperature profile over the length of the rotary tube 6, which has so far been considered to be ideal, is schematically illustrated in the diagram of FIG. 2. The temperature T of the surface of the loose granulate 9 (determined by means of pyrometer) is plotted on the y-axis against the axial position in the rotary tube 6. Directly after having been supplied, the granulate is dried at a temperature of about 500° C. for a duration of 30 min, and it is subsequently pre-densified thermally at a gradually rising temperature at about 1000° C. to 1300° C. The gas contained in the porous granulate is here replaced by helium at the same time. The densification and gas-exchange process lasts for about 60 min. Subsequently, the loose granulate 9 is heated up for complete vitrification, thereby reaching a maximum temperature of about 1460° C. By that time the mean residence time in the rotary kiln 6 is about 3 h.

In this process stadium the helium content of the vitrified quartz glass particles 15 is relatively high. The gas volume of the theoretically releasable helium gas is 3 times the volume of the particles as such (at a gas volume standardized to 25° and atmospheric pressure).

After having passed the separating screen 12, the vitrified quartz glass particles 15, which are highly loaded with helium, are gradually cooling down in the post-treatment zone and are substantially degassed at the same time due to the atmosphere which is poorer in helium, which means that helium is given the opportunity to diffuse out of the dense quartz glass granules in that the temperature is kept sufficiently high—above 500° C. in the example, and the outgassing duration is kept sufficiently long—in the example for more than 30 minutes. After completion of the post-treatment the gas volume of helium to be released is at any rate only less than two times the volume of the particles as such (standardized to 25° C. and atmospheric pressure).

The above-mentioned process parameters in combination with the residence time of the granulate 9 in the rotary kiln 1 and the helium atmosphere in the vitrification zone 13 have the effect that the open porosity is mainly disappearing. The surface is dense. The quartz glass particles 15 are evidently completely transparent upon removal in this method stage.

If agglomerates are arising, these will disintegrate again due to the mechanical stress in the moving loose granulate material 9 or by vibration of the rotary tube 6.

At the same time one can observe a uniform abrasion of $Al_2O_3$, which passes onto the surface of the granulate particles 9 and into the pores thereof. The vitrified quartz glass granules produced thereby are homogeneously doped with $Al_2O_3$ at about 15 wt. ppm. Adhesions to the inner wall of the rotary tube 6 are mainly avoided because of the poor wettability of $Al_2O_3$ with quartz glass.

The completely vitrified and homogeneously doped quartz glass granules have a density of more than 2.0 g/cm³ and a BET surface area of less than 1 m²/g, and they have a relatively low helium content—in consideration of the vitrification under helium. They are continuously removed via the discharge housing 11 and the outlet nozzle 17.

The quartz glass granules are used for producing the outer layer of a quartz glass crucible, with the viscosity-enhancing effect of the $Al_2O_3$ doping assisting in increasing the service life of the quartz glass crucible.

Further comparative examples and embodiments of the vitrification of porous $SiO_2$ granulate in the rotary kiln under He atmosphere shall be explained hereinafter. These examples are preliminary tests in part and do not necessarily adhere to the above-explained process conditions, which are considered to be optimum in the final analysis, but they throw a light on the execution and effect of the teaching according to the invention.

Example 1

Using the Granulate of Example A

Sample A

In a preliminary test, the granulate was sintered in ambient atmosphere (air) at a maximum temperature of 1350° C. At temperatures of >1350° C. the material adheres to the rotary tube. The granulate shows sinter phenomena, but many particles are not completely sintered.

Sample B

In a first modification of this procedure, the granulate was sintered in He atmosphere during flushing operation at a flow rate of 1.1 m$^3$/h and at a maximum temperature of 1350° C. in the rotary kiln 1.

The quartz glass granules produced in this way are homogeneously sintered in part; only a few particles are not sintered. They could be vitrified in a transparent form and with hardly any bubbles in the arc melt during manufacture of quartz glass crucibles.

Sample C

In a further modification of this procedure, the granulate was also sintered in He atmosphere during flushing operation at a flow rate of 2.1 m$^3$/h and at a maximum temperature of 1400° C. in the rotary kiln 1. Here, the material tends to adhere to the rotary tube 6. Adhesions could be avoided by way of mechanical vibrations (beating and shaking) of the rotary tube 6. This, however, resulted in a higher throughput (of 2 kg/h to 4 kg/h) which deteriorated the sintering degree. The throughput could be reduced again by changing the inclination of the rotary tube 6.

The quartz glass granules 15 produced in this way are homogeneously sintered (only a few particles are hardly sintered or not sintered). They could be vitrified in a transparent form and with hardly any bubbles in the arc melt during manufacture of quartz glass crucibles.

Example 2

Using the Granulate of Example B

Sample D

The granulate is sintered in He atmosphere during the flushing operation at a flow rate of 3.5 m$^3$/h and at a maximum temperature of 1400° C. The granulate shows sinter phenomena, but large particles are not completely sintered. At the given particle sizes and temperatures, the throughput of 4 kg/h is evidently too high. The material cannot be vitrified without bubbles in the arc melt; opaque portions with fine bubbles can be detected.

Sample E

In a modification of the method the throughput was reduced by reducing the speed and inclination to 2.4 kg/h, and the granulate was sintered in He atmosphere during the flushing operation at a flow rate of 3.5 m$^3$/h and at 1400° C. The quartz glass granules produced thereby are not homogeneously sintered yet. It is only when the maximum temperature is raised to 1430° C. (under otherwise identical parameters) that almost transparent quartz glass granules are obtained. At even higher temperatures, the granulate tends to adhere more and more to the rotary tube.

The quartz glass granules produced thereby could be vitrified in the arc melt during manufacture of quartz glass crucibles into transparent layers with hardly any bubbles.

Sample F

In a further modification of the method, the granulate was sintered twice in successive order in He atmosphere at a flow rate of 3.5 m$^3$/h. The first pass took place at 1400° C. and the second pass at 1450° C. Hardly any adhesions were here observed.

The quartz glass granules obtained thereby are fully vitrified in transparent form. It is only with large particles that bubble-shaped gas inclusions can be detected. They can be vitrified during manufacture of quartz glass crucibles into transparent layers containing almost no bubbles.

The above-mentioned samples B to F were fused in a rotary tube which had not yet been equipped with a post-treatment zone. Otherwise, a post-treatment of the quartz glass granules 15 within the meaning of this invention was also not intended. However, when the quartz glass granules obtained thereby were used for fusion of the quartz glass, it became apparent that there was some need for improvement, particularly in the light of the very high demands made on the absence of bubbles in the quartz glass.

Therefore, the rotary kiln 1 was equipped with the post-treatment zone 14 which allows a prolonged cooling-off phase, namely in a helium-poor atmosphere. Under these boundary conditions some of the above-described tests which had more or less been successful were repeated, but now additionally with the above-described post-treatment of the vitrified quartz glass particles in the post-treatment zone 14.

Sample B'—with Post-Treatment of the Vitrified Quartz Glass Granules

The granulate was sintered in a He atmosphere during flushing operation at a flow rate of 1.1 m$^3$/h and at a maximum temperature of 1350° C.:

The subsequent post-treatment in helium-poor atmosphere only yielded a slight improvement in comparison with sample B upon use in the arc melt during manufacture of quartz glass crucibles.

Sample C'—with Post-Treatment of the Vitrified Quartz Glass Granules

The granulate was sintered in He atmosphere during flushing operation and at a maximum temperature of 1400° C. and supplied in the same rotary kiln 1, as explained above, via the openings of the separating screen 12 to the post-treatment zone 14 and post-treated therein in a helium-poor atmosphere and substantially degassed, as has been explained above.

The quartz glass granules produced thereby are homogeneously sintered (only a few particles are hardly sintered or are not sintered). The use of the quartz glass granules of sample C' in the arc melt during manufacture of quartz glass crucibles resulted in a significant improvement with respect to the absence of bubbles in comparison with the untreated sample C.

Sample E'—with Post-Treatment of the Vitrified Quartz Glass Granules

At a throughput of 2.4 kg/h the granulate was sintered in He atmosphere during flushing operation at a flow rate of 3.5 m$^3$/h at 1430° C. and subsequently post-treated in helium-poor atmosphere in the post-treatment zone 14.

The quartz glass granules produced thereby could be vitrified in the electric arc melt during manufacture of quartz glass crucibles into transparent and low-bubble layers. This also yielded significant improvements with respect to the absence of bubbles as compared with sample E that had not been post-treated.

Sample F'—with Post-Treatment of the Vitrified Quartz Glass Granules

The granulate that was sintered twice in successive order in He atmosphere at a flow rate of 3.5 m$^3$/h showed the initially best transparence and absence of bubbles of all samples A to F. The quartz glass granules obtained thereby are fully and transparently vitrified. Bubble-shaped gas inclusions can only be detected in the case of large particles.

Evidently, these quartz glass granules 15, however, were particularly highly loaded with helium, for the post-treatment in the helium-poor atmosphere of the post-treatment zone 14 showed a considerable improvement in these granules with respect to the absence of bubbles during fusion in the manufacture of quartz glass crucibles.

The invention claimed is:

1. A method for producing synthetic quartz glass granules by vitrifying a free-flowing $SiO_2$ granulate, the method comprising:
    granulating pyrogenically produced silicic acid so as to form the $SiO_2$ granulate of porous granulate particles,
    drying the $SiO_2$ granulate,
    cleaning the $SiO_2$ granulate by heating in a halogen-containing atmosphere in a kiln,
    vitrifying the cleaned SiO2 granulate in a treatment gas containing at least 30% by vol. of helium, hydrogen or a mixture of helium and hydrogen so as to form vitrified quartz glass granules, and subjecting the vitrified quartz glass granules to a post-treatment in an atmosphere containing helium or hydrogen in an amount less than 20%, and at a treatment temperature of 300° C. or more for a treatment period of at least 10 minutes,
    wherein the kiln is a rotary kiln rotating about a central axis,
    wherein the cleaning and the vitrifying of the SiO2 granulate and the post-treatment of the vitrified quartz-glass granules are carried out in a rotary tube of the rotary kiln rotating about the central axis, and
    wherein the rotary tube comprises an inner wall consisting of a ceramic material and the vitrifying takes place inside said inner wall.

2. The method according to claim 1, wherein the vitrified quartz glass granules have a surface temperature that, between the vitrifying and the post-treatment, does not fall below 200° C.

3. The method according to claim 1, wherein the treatment temperature of the post-treatment is 800° C. or more.

4. The method according to claim 1, wherein the treatment period of the post-treatment is 15 minutes or more.

5. The method according to claim 1, wherein the quartz glass granules after completion of the post-treatment have a content of hydrogen and helium per 1 $cm^3$ that would occupy a gas volume of less than 2 $cm^3$ under normal conditions.

6. The method according to claim 1, wherein the vitrifying of the $SiO_2$ granulate and the post-treatment of the quartz glass granules both take place in the rotary kiln, said rotary kiln, when viewed in a direction transverse to the central axis, being subdivided into a plurality of zones, including a vitrification zone in which the vitrifying occurs and a post-treatment zone in which the post-treatment occurs.

7. The method according to claim 6, wherein the drying and cleaning of the $SiO_2$ granulate takes place in the rotary kiln, said rotary kiln, when viewed in a direction transverse to the central axis further comprising a drying zone and a cleaning zone.

8. The method according to claim 6, wherein two of the zones of the rotary kiln are adjacent each other and subdivided by separating screens having openings or by labyrinth traps.

9. The method according to claim 6, wherein the rotary tube for the cleaning and for the vitrifying is heated, and wherein the post-treatment takes place in a rotary tube portion of quartz glass in the post-treatment zone.

10. The method according to claim 9, wherein the rotary tubes for the cleaning and the vitrifying are each heated using a resistance heater surrounding each rotary tube, and wherein the rotary tube used for the post-treatment or a portion of the rotary tube used for the post-treatment is not directly heated.

11. The method according to claim 1, wherein the SiO2 granulate has a fines content with particles sizes of less than 100 μm that is preselected so as to constitute less than 10% by wt. of a total weight of the $SiO_2$ granulate.

12. The method according to claim 1, wherein the cleaning in the rotary tube is carried out in a chlorine-containing atmosphere at a temperature in a range between 900° C. and 1250° C.

13. The method according to claim 1, wherein the treatment gas during vitrification contains at least 50% helium, hydrogen, or a mixture of helium and hydrogen.

14. The method according to claim 1, wherein the granulate particles are heated during said vitrifying to a temperature in a range of 1300° C. to 1600° C.

15. The method according to claim 14, wherein the granulate particles or the vitrified quartz-glass granules are subjected to vibration.

16. The method according to claim 1, wherein the ceramic material is of $Al_2O_3$, $ZrO_2$ or $Si_3N_4$.

17. The method according to claim 16, wherein the inner wall of the rotary tube has an alkali content of less than 0.5%.

18. The method according to claim 16, wherein the inner wall of the rotary tube consists of synthetically produced $Al_2O_3$.

19. The method according to any one of claim 16, wherein an $Al_2O_3$ doping of the vitrified quartz glass granules in the range of 1-20 wt. ppm is effected by using an $Al_2O_3$-containing rotary tube.

20. The method according to claim 1, wherein the granulate particles have a mean grain size between 20 μm and 2000 μm ($D_{50}$ value each time).

21. The method according to claim 1, wherein the granulate particles have a particle size distribution in which a particle diameter assigned to the $D_{90}$ value is not more than twice as great as a particle diameter assigned to the $D_{10}$ value.

22. The method according to claim 1, wherein the vitrified quartz glass granules have a surface temperature that, between the vitrifying and the post-treatment, does not fall below 800° C.

23. The method according to claim 1, wherein the porous granulate particles have a mean grain size between 100 μm and 400 μm ($D_{50}$ value each time).

24. The method according to claim 1 wherein the treatment gas during vitrification contains at least 95% helium, hydrogen, or a mixture of helium and hydrogen.

* * * * *